United States Patent [19]

Mikel

[11] Patent Number: 5,760,545
[45] Date of Patent: Jun. 2, 1998

[54] TOW ADAPTER FOR SELECTIVELY OUTPUTTING AN ENERGIZATION SIGNAL TO A TOWED VEHICLE BASED ON AN ENABLE SIGNAL

[75] Inventor: Robert J. Mikel, Hinckley, Ohio

[73] Assignee: ACAR Industries, Inc., Willoughby, Ohio

[21] Appl. No.: 599,560

[22] Filed: Feb. 15, 1996

[51] Int. Cl.$^6$ .............................. B60Q 1/38; H05B 37/00
[52] U.S. Cl. ................ 315/77; 315/82; 307/10.8; 340/475
[58] Field of Search .................. 315/76, 77, 78, 315/79, 80, 81, 82, 83; 307/9.1, 10.1, 10.8; 340/431, 475

[56] References Cited

U.S. PATENT DOCUMENTS

| | | | |
|---|---|---|---|
| 3,849,664 | 11/1974 | Bryant | 307/10 LS |
| 3,883,845 | 5/1975 | DeVita | 340/67 |
| 3,896,415 | 7/1975 | Carter, III | 340/67 |
| 3,955,174 | 5/1976 | Ives et al. | 340/73 |
| 3,970,860 | 7/1976 | Purdy | 307/10 LS |
| 4,006,453 | 2/1977 | Bryant | 340/67 |
| 4,064,413 | 12/1977 | Anderson | 315/77 |
| 4,270,115 | 5/1981 | Bonnett | 340/67 |
| 4,325,052 | 4/1982 | Koerner | 340/67 |
| 4,751,431 | 6/1988 | Ducote | 315/77 |
| 4,857,807 | 8/1989 | Hargis | 315/77 |
| 4,939,503 | 7/1990 | Swanson | 340/468 |
| 4,970,493 | 11/1990 | Yim | 340/468 |
| 5,002,343 | 3/1991 | Brearley et al. | 303/7 |
| 5,027,031 | 6/1991 | Wheelock | 315/77 |
| 5,030,938 | 7/1991 | Bondzeit | 340/431 |
| 5,050,938 | 9/1991 | Brearley et al. | 303/7 |
| 5,080,445 | 1/1992 | Brearley et al. | 303/7 |
| 5,165,666 | 11/1992 | Gerencser | 362/833 |
| 5,212,469 | 5/1993 | Avellino | 340/475 |
| 5,241,241 | 8/1993 | Eccleston | 315/82 |
| 5,285,113 | 2/1994 | Schlich | 307/9.1 |
| 5,389,823 | 2/1995 | Hopkins et al. | 307/10.1 |
| 5,428,512 | 6/1995 | Mouzas | 362/80 |
| 5,615,930 | 4/1997 | McGrath et al. | 303/7 |
| 5,620,236 | 4/1997 | McGrath et al. | 303/7 |

OTHER PUBLICATIONS

Circuit schematic of a 2 to 3 tail light converter, one sheet, known or used by others in this country prior to the filing date of this patent application.

Model PL100R tail light converter, two-sheet product description including circuit schematic, on sale in this country more than one year prior to the filing date of this patent application.

MME Products Zero Drop® Tail Light Converter, Model PL100RX, four-sheet product description including circuit schematic, on sale in this country more than one year prior to the filing date of this patent application.

Chrysler Corp. Jeep Grand Cherokee Wiring Harness, Model #82201430, three-sheet product description including circuit schematic, on sale in this country more than one year prior to filing date of this patent application.

*Primary Examiner*—Robert J. Pascal
*Assistant Examiner*—David H. Vu
*Attorney, Agent, or Firm*—Watts, Hoffmann, Fisher & Heinke, Co., L.P.A.

[57] ABSTRACT

A tow adapter adapts tail light signals of a towing vehicle for suitable tail light signals of a towed vehicle. The tow adapter adapts a left turn signal, a right turn signal, and a brake signal from the towing vehicle to energize left and right tow lamps of the towed vehicle. To energize the left tow lamp, the tow adapter selectively generates a left energization signal and a left enable signal based on the left turn signal and the brake signal. The tow adapter then selectively outputs the left energization signal based on the left enable signal to energize the left tow lamp. The tow adapter similarly adapts the right turn signal and the brake signal to energize the right tow lamp. Circuitry for one embodiment for the tow adapter minimizes any voltage loss in adapting tail light signals and functions despite a burned-out or removed tail light lamp of the towing vehicle. The circuitry also adapts a brake signal for the towed vehicle despite a tow adapter malfunction.

24 Claims, 2 Drawing Sheets

TOW ADAPTER FOR SELECTIVELY OUTPUTTING AN ENERGIZATION SIGNAL TO A TOWED VEHICLE BASED ON AN ENABLE SIGNAL

BACKGROUND OF THE INVENTION

1. Field of the Invention

The present invention relates generally to the field of signal adapters. More particularly, the present invention relates to the field of tow adapters for adapting tail light signals of a towing vehicle for tail light signals of a towed vehicle.

2. Description of the Related Art

Various tow adapters for adapting tail light signals of a towing vehicle for tail light signals of a towed vehicle are known.

One typical tow adapter couples a tail light signal from the towing vehicle through one or more circuit elements, such as a transistor or diode, to energize a tail light lamp of the towed vehicle. The voltage signal provided to the tail light lamp of the towed vehicle, however, is reduced by the voltage drop across the circuit element or elements, thereby reducing the brightness with which the tail light lamp of the towed vehicle is energized.

One typical tow adapter also uses the tail light lamps of the towing vehicle to complete a circuit path to ground in energizing one or more tail light lamps of the towed vehicle. Such tow adapters, however, are prevented from controlling the tail light lamps of the towed vehicle when one or more tail light lamps of the towing vehicle are burned-out or removed.

Furthermore, a burned-out or removed tail light lamp for some towing vehicles disables the flasher unit of the towing vehicle from providing a pulsating signal to the burned-out or removed tail light lamp. As a result, some typical tow adapters fail to flash the corresponding tail light lamp of the towed vehicle.

SUMMARY OF THE INVENTION

One object of the present invention is to provide for a new and improved tow adapter that adapts tail light signals of a towing vehicle for suitable tail light signals of a towed vehicle.

Another object of the present invention is to provide for a tow adapter that minimizes any voltage loss in adapting a tail light signal of a towing vehicle for a suitable tail light signal of a towed vehicle.

Another object of the present invention is to provide for a tow adapter that adapts a tail light signal of a towing vehicle for a suitable tail light signal of a towed vehicle despite a burned-out or removed tail light lamp of the towing vehicle.

Another object of the present invention is to provide for a tow adapter that adapts a brake signal of a towing vehicle for a suitable tail light signal of a towed vehicle despite a tow adapter malfunction.

A method for use in a tow adapter for adapting a first input signal and a second input signal from a towing vehicle for a towed vehicle is described. The method comprises steps of receiving from the towing vehicle the first input signal at a first input of the tow adapter and the second input signal at a second input of the tow adapter, selectively generating an enable signal and an energization signal based on the first input signal and the second input signal, and selectively outputting the energization signal to the towed vehicle based on the enable signal.

A method for use in a tow adapter for adapting a turn signal and a brake signal from a towing vehicle for a towed vehicle is described. The method comprises steps of receiving from the towing vehicle the turn signal at a turn input of the tow adapter and the brake signal at a brake input of the tow adapter, selectively coupling the turn input or the brake input to a first node based on the turn signal to generate an energization signal, selectively coupling the brake input to a second node based on the turn signal to generate an enable signal, and selectively coupling the first node to an output of the tow adapter based on the enable signal to output the energization signal to the towed vehicle.

An apparatus for adapting a first input signal and a second input signal from a towing vehicle for a towed vehicle is described. The apparatus comprises control circuitry having a first input for receiving the first input signal from the towing vehicle and having a second input for receiving the second input signal from the towing vehicle. The control circuitry selectively generates an enable signal and an energization signal based on the first input signal and the second input signal. The apparatus also comprises output circuitry coupled to the control circuitry for receiving the energization signal and the enable signal. The output circuitry selectively outputs the energization signal to the towed vehicle based on the enable signal.

An apparatus for adapting a turn signal and a brake signal from a towing vehicle for a towed vehicle is described. The apparatus comprises control circuitry having a turn input for receiving the turn signal from the towing vehicle and having a brake input for receiving the brake signal from the towing vehicle. The control circuitry selectively couples the turn input or the brake input to a first node based on the turn signal to generate an energization signal. The control circuitry also selectively couples the brake input to a second node based on the turn signal to generate an enable signal. The apparatus also comprises output circuitry coupled to the first node for receiving the energization signal and to the second node for receiving the enable signal. The output circuitry selectively couples the first node to an output based on the enable signal to output the energization signal to the towed vehicle.

An apparatus for adapting a left turn signal, a right turn signal, and a brake signal from a towing vehicle for a towed vehicle is described. The apparatus comprises left control circuitry having a left turn input for receiving the left turn signal from the towing vehicle and having a brake input for receiving the brake signal from the towing vehicle. The left control circuitry selectively couples the left turn input or the brake input to a first node based on the left turn signal to generate a left energization signal. The left control circuitry also selectively couples the brake input to a second node based on the left turn signal to generate a left enable signal. The apparatus also comprises left output circuitry coupled to the first node for receiving the left energization signal and to the second node for receiving the left enable signal. The left output circuitry selectively couples the first node to a left output based on the left enable signal to output the left energization signal to the towed vehicle. The apparatus further comprises right control circuitry having a right turn input for receiving the right turn signal from the towing vehicle and having a brake input for receiving the brake signal from the towing vehicle. The right control circuitry selectively couples the right turn input or the brake input to a third node based on the right turn signal to generate a right energization signal. The right control circuitry also selectively couples the brake input to a fourth node based on the right turn signal to generate a right enable signal. The apparatus still further comprises right output circuitry coupled to the third node for receiving the right energization signal and to the fourth node for receiving the right enable signal. The right output circuitry selectively couples the third node to a right output based on the right enable signal to output the right energization signal to the towed vehicle.

A tow adapter for adapting a turn signal and a brake signal from a towing vehicle for a towed vehicle is described. The tow adapter comprises control circuitry having a turn input for receiving the turn signal from the towing vehicle and having a brake input for receiving the brake signal from the towing vehicle. The control circuitry comprises a first relay coil coupled to the turn input for receiving the turn signal, a first relay contact coupled to the turn input and to a first node for selectively coupling the turn input to the first node to generate an energization signal when the first relay coil is energized by the turn signal, a second relay contact coupled to the brake input and to the first node for selectively coupling the brake input to the first node to generate the energization signal when the first relay coil is deenergized by the turn signal, and a third relay contact coupled to the brake input and to a second node for selectively coupling the brake input to the second node to generate an enable signal when the first relay coil is energized by the turn signal. The apparatus also comprises output circuitry coupled to the first node and to the second node. The output circuitry comprises a second relay coil coupled to the second node for receiving the enable signal, and a fourth relay contact coupled to the first node and to an output for selectively coupling the first node to the output to output the energization signal to the towed vehicle when the second relay coil is deenergized by the enable signal.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
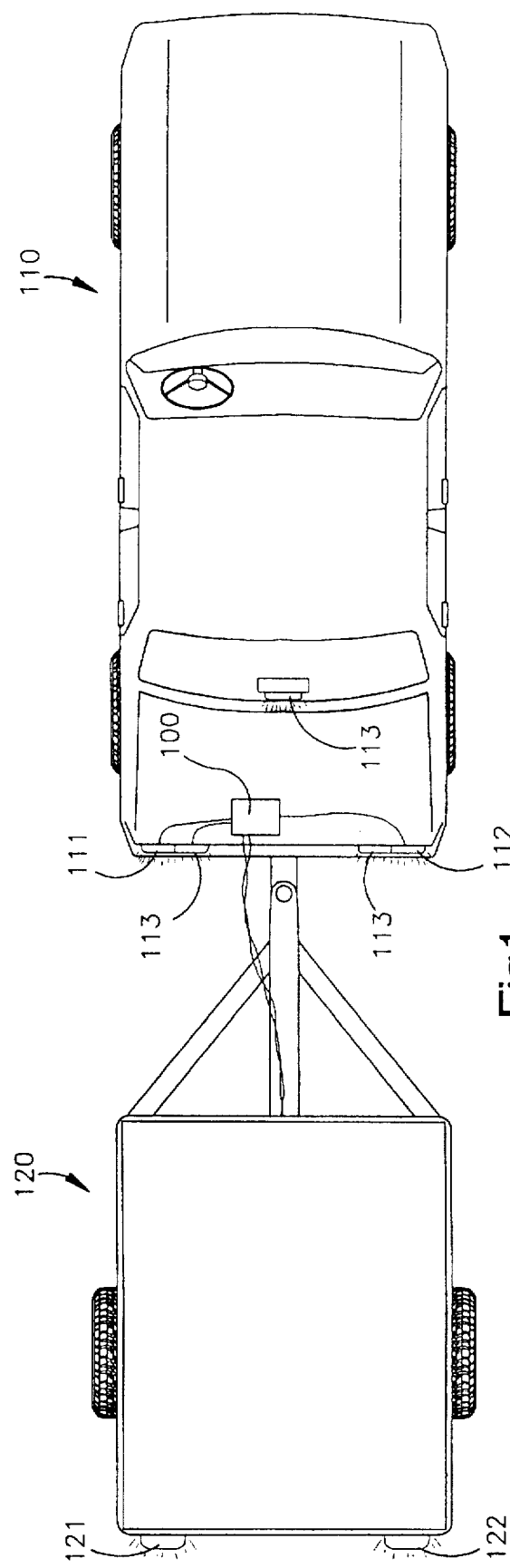
FIG. 1 illustrates a tow adapter for adapting tail light signals of a towing vehicle for suitable tail light signals of a towed vehicle.

FIG. 1 illustrates a tow adapter 100 for adapting tail light signals of a towing vehicle 110 for suitable tail light signals of a towed vehicle 120. The towed vehicle 120 may be a boat or horse trailer, for example.

The tow adapter 100 is electrically coupled to receive a left signal, a right signal, and a brake signal from circuitry of the towing vehicle 110. The tow adapter 100 is also electrically coupled to output signals to a left tow lamp 121 of the towed vehicle 120 and to a right tow lamp 122 of the towed vehicle 120 in response to the signals received from the towing vehicle 110. The tow adapter 100 may be positioned in any suitable location, such as in the trunk of the towing vehicle 110 as illustrated in FIG. 1.

When the motorist of the towing vehicle 110 activates the left turn signal of the towing vehicle 110, the towing vehicle 110 generates the left signal that pulsates to flash a left turn lamp 111 of the towing vehicle 110. In response to the pulsating left signal, the tow adapter 100 also generates and outputs a pulsating signal to flash the left tow lamp 121.

When the motorist activates the right turn signal of the towing vehicle 110, the towing vehicle 110 generates the right signal that pulsates to flash a right turn lamp 112 of the towing vehicle 110. In response to the pulsating right signal, the tow adapter 100 also generates and outputs a pulsating signal to flash the right tow lamp 122.

When the motorist activates the emergency flashers of the towing vehicle 110, the towing vehicle 110 generates both the left and right signals that pulsate to flash both the left and right turn lamps 111–112. In response to the pulsating left and right signals, the tow adapter 100 generates and outputs pulsating signals to flash both the left and right tow lamps 121–122.

When the motorist applies the brake of the towing vehicle 110, the towing vehicle 110 generates the brake signal to energize brake lamps 113 of the towing vehicle 110. In response to the brake signal, the tow adapter 100 generates and outputs signals to energize the left and right tow lamps 121–122.

When the motorist also activates the left or right turn signal while the brake is applied, the towing vehicle 110 generates the left or right signal, respectively, to flash the left or right turn lamp 111–112, respectively, and also generates the brake signal to energize the brake lamps 113. In response to these signals, the tow adapter 100 generates and outputs a pulsating signal to flash the left or right tow lamp 121–122, respectively, and also generates and outputs a signal to energize the other tow lamp for the duration of the brake signal.

TOW ADAPTER

Figure 2:
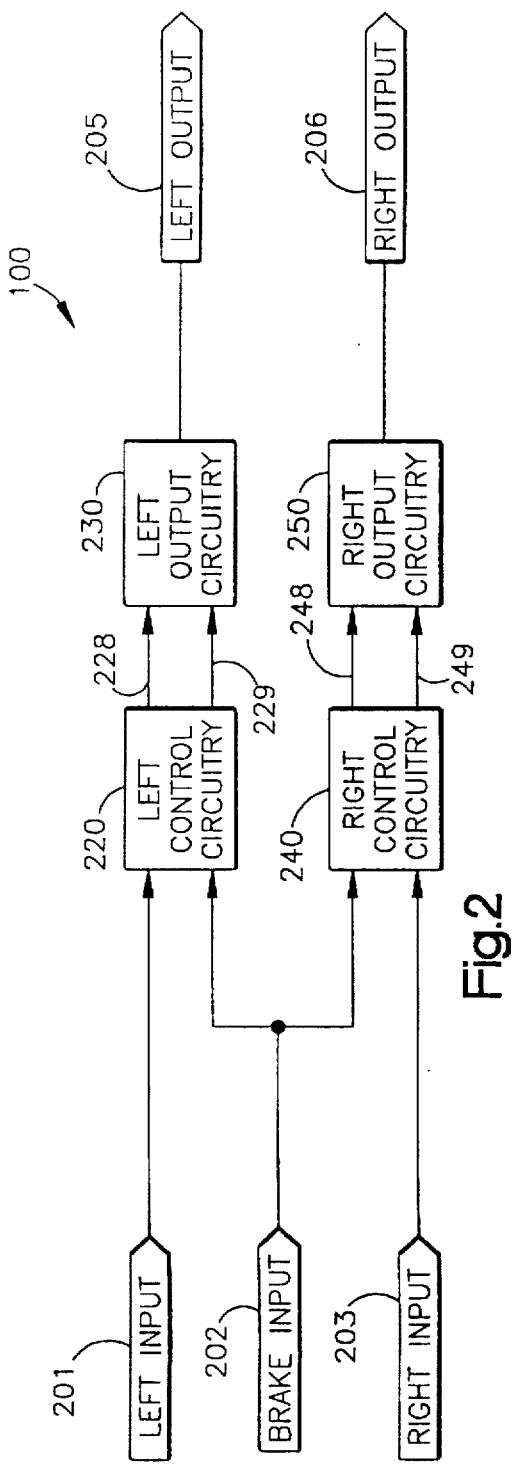
FIG. 2 illustrates in block diagram form the tow adapter of FIG. 1.

FIG. 2 illustrates the tow adapter 100 in block diagram form. The tow adapter 100 receives from the towing vehicle 110 the left signal at a left input 201, the brake signal at a brake input 202, and the right signal at a right input 203. The tow adapter 100 selectively generates and outputs signals at a left output 205 to energize and deenergize the left tow lamp 121. The tow adapter 100 also selectively generates and outputs signals at a right output 206 to energize and deenergize the right tow lamp 122.

The tow adapter 100 comprises left control circuitry 220 coupled to the left input 201 and to the brake input 202 for receiving the left signal and the brake signal from the towing vehicle 110. The left control circuitry 220 selectively generates and outputs a left enable signal at a left enable output 228 and a left energization signal at a left energization output 229 based on the left signal and the brake signal. The tow adapter 100 also comprises left output circuitry 230 having inputs coupled to the left enable output 228 and to the left energization output 229 for receiving the left enable signal and the left energization signal from the left control circuitry 220. The left output circuitry 230 selectively outputs the left energization signal at the left output 205 based on the left enable signal. The left control circuitry 220 and the left output circuitry 230 may comprise any suitable circuitry, including any suitable analog or digital circuitry.

In the absence of the left signal and the brake signal, the left control circuitry 220 deactivates the generation and output of any left energization signal at the left energization output 229. The left output circuitry 230 in response deactivates the generation and output of any signal at the left output 205 to deenergize the left tow lamp 121.

When the towing vehicle 110 generates the left signal in the absence of the brake signal, the left control circuitry 220 generates and outputs the left enable signal at the left enable output 228 and the left energization signal at the left energization output 229. The left output circuitry 230 in response outputs the left energization signal to the left output 205 to energize the left tow lamp 121. When the towing vehicle 110 pulsates the left signal, the left control circuitry 220 generates and outputs the left enable signal at the left enable output 228 and a pulsating left energization signal at the left energization output 229 to flash the left tow lamp 121.

When the towing vehicle 110 generates the brake signal in the absence of the left signal, the left control circuitry 220 generates and outputs the left enable signal at the left enable output 228 and the left energization signal at the left energization output 229 for the duration of the brake signal. The left output circuitry 230 in response outputs the left energization signal to the left output 205 to energize the left tow lamp 121.

When the towing vehicle 110 generates both the left signal and the brake signal, the left control circuitry 220 deactivates the left enable signal at the left enable output 228. The left output circuitry 230 in response deactivates the generation and output of any signal at the left output 205 to deenergize the left tow lamp 121. When the towing vehicle 110 pulsates the left signal, the left control circuitry 220 generates and outputs a pulsating left enable signal at the left enable output 228 and the left energization signal at the left energization output 229 to flash the left tow lamp 121.

The tow adapter 100 comprises right control circuitry 240 coupled to the right input 203 and to the brake input 202 for receiving the right signal and the brake signal from the towing vehicle 110. The right control circuitry 240 selectively generates and outputs a right enable signal at a right enable output 248 and a right energization signal at a right energization output 249 based on the right signal and the brake signal. The tow adapter 100 also comprises right output circuitry 250 having inputs coupled to the right enable output 248 and to the right energization output 249 for receiving the right enable signal and the right energization signal from the right control circuitry 240. The right output circuitry 250 selectively outputs the right energization signal at the right output 206 based on the right enable signal. The right control circuitry 240 and the right output circuitry 250 may comprise any suitable circuitry, including any suitable analog or digital circuitry.

In the absence of the right signal and the brake signal, the right control circuitry 240 deactivates the generation and output of any right energization signal at the right energization output 249. The right output circuitry 250 in response deactivates the generation and output of any signal at the right output 206 to deenergize the right tow lamp 122.

When the towing vehicle 110 generates the right signal in the absence of the brake signal, the right control circuitry 240 generates and outputs the right enable signal at the right enable output 248 and the right energization signal at the right energization output 249. The right output circuitry 250 in response outputs the right energization signal to the right output 206 to energize the right tow lamp 122. When the towing vehicle 110 pulsates the right signal, the right control circuitry 240 generates and outputs the right enable signal at the right enable output 248 and a pulsating right energization signal at the right energization output 249 to flash the right tow lamp 122.

When the towing vehicle 110 generates the brake signal in the absence of the right signal, the right control circuitry 240 generates and outputs the right enable signal at the right enable output 248 and the right energization signal at the right energization output 249 for the duration of the brake signal. The right output circuitry 250 in response outputs the right energization signal to the right output 206 to energize the right tow lamp 122.

When the towing vehicle 110 generates both the right signal and the brake signal, the right control circuitry 240 deactivates the right enable signal at the right enable output 248. The right output circuitry 250 in response deactivates the generation and output of any signal at the right output 206 to deenergize the right tow lamp 122. When the towing vehicle 110 pulsates the right signal, the right control circuitry 240 generates and outputs a pulsating right enable signal at the right enable output 248 and the right energization signal at the right energization output 249 to flash the right tow lamp 122.

CIRCUITRY FOR TOW ADAPTER

Figure 3:
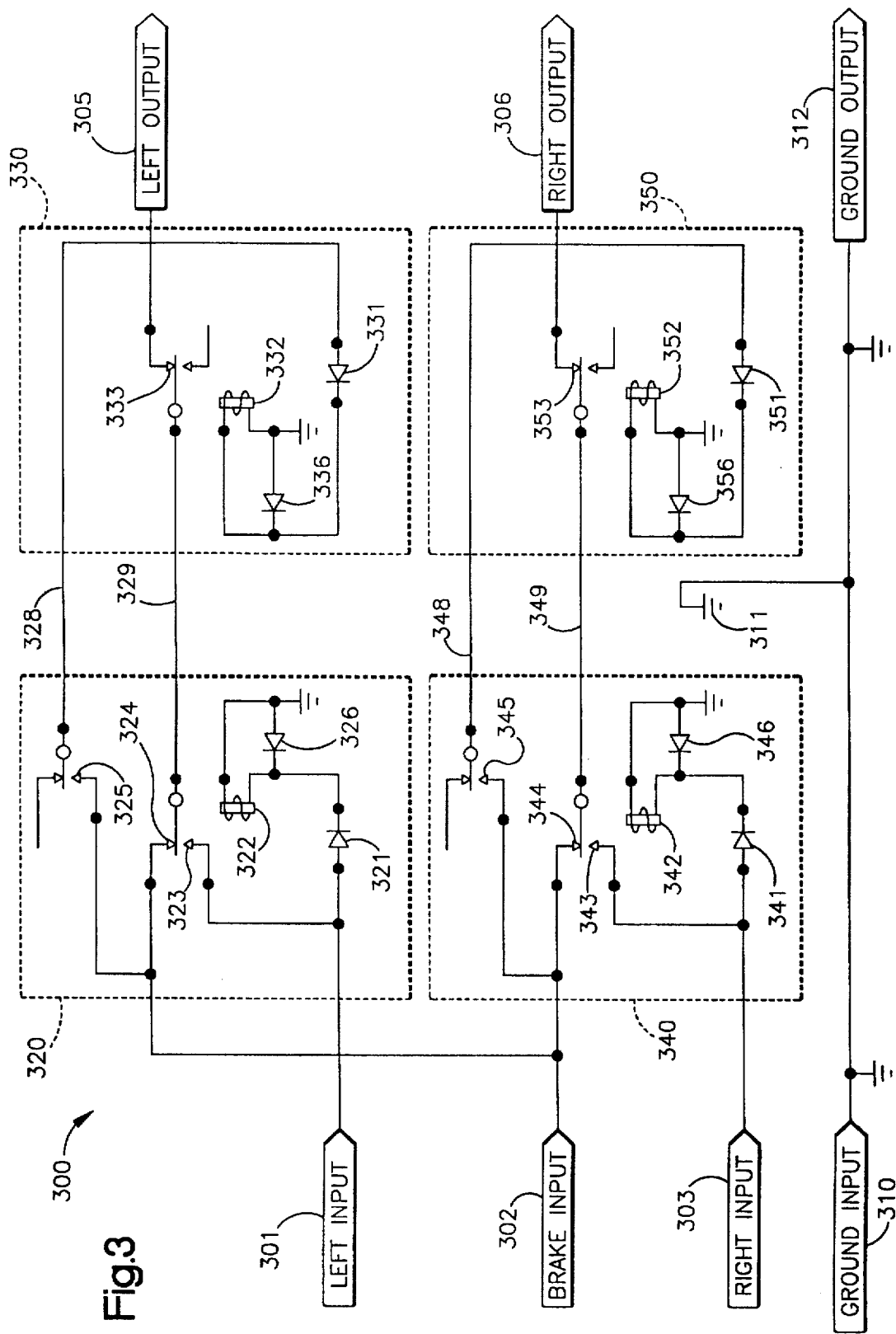
FIG. 3 illustrates circuitry for one embodiment for the tow adapter of FIG. 1.

FIG. 3 illustrates circuitry 300 for one embodiment for the tow adapter 100. Circuitry 300 comprises a left input 301, a brake input 302, and a right input 303 that correspond to the left input 201, the brake input 202, and the right input 203 of FIG. 2, respectively. Circuitry 300 also comprises a left output 305 and a right output 306 that correspond to the left output 205 and the right output 206 of FIG. 2, respectively. Circuitry 300 further comprises left control circuitry 320, left output circuitry 330, right control circuitry 340, and right output circuitry 350 that correspond to the left control circuitry 220, left output circuitry 230, right control circuitry 240, and right output circuitry 250 of FIG. 2, respectively.

The circuitry 300 is grounded by the ground signal at a chassis ground input 310. The chassis ground input 310 is coupled to ground a voltage terminal 311 and a chassis ground output 312. The chassis ground input 310 may be suitably grounded to the towing vehicle 110, and the chassis ground output 312 may be suitably grounded to the towed vehicle 120.

The left control circuitry 320 comprises diodes 321 and 326 and a relay having a relay coil 322, normally-open relay contacts 323 and 325, and a normally-closed relay contact 324. The diodes 321 and 326 may be any suitable diodes, such as Part No. 1N4148 available from Motorola for example. The relay for the left control circuitry 320 may be any suitable relay, such as a double-pull, double-throw relay having Part No. AJW721138 available from Aromat for example.

The anode of the diode 321 is coupled to the left input 301, and the cathode of the diode 321 is coupled to a first end of the relay coil 322. The other end of the relay coil 322 is coupled to the ground terminal 311. The cathode of the diode 326 is coupled to the first end of the relay coil 322, and the anode of the diode 326 is coupled to the other end of the relay coil 322. The diodes 321 and 326 help to isolate the towing vehicle 110 from any electrical surges or noise by the circuitry 300.

The normally-open relay contact 323 selectively couples the left input 301 to a node 329. The node 329 corresponds to the left energization output 229 of FIG. 2. The normally-closed relay contact 324 selectively couples the brake input 302 to the node 329. The normally-open relay contact 325 selectively couples the brake input 302 to a node 328. The node 328 corresponds to the left enable output 228 of FIG. 2. Energization of the relay coil 322 closes both of the relay contacts 323 and 325 and opens the relay contact 324.

The left output circuitry 330 comprises diodes 331 and 336 and a relay having a relay coil 332 and a normally-closed relay contact 333. The diodes 331 and 336 may be any suitable diodes, such as Part No. 1N4148 available from Motorola for example. The relay for the left output circuitry 330 may be any suitable relay, such as a single-pull, double-throw relay having Part No. AZ8-1CH-9DE available from Zettler for example.

The anode of the diode 331 is coupled to the node 328, and the cathode of the diode 331 is coupled to a first end of the relay coil 332. The other end of the relay coil 332 is coupled to the ground terminal 311. The cathode of the diode 336 is coupled to the first end of the relay coil 332, and the anode of the diode 336 is coupled to the other end of the relay coil 332. The diodes 331 and 336 help to isolate the towing vehicle 110 from any electrical surges or noise by the circuitry 300.

The normally-closed relay contact 333 selectively couples the node 329 to the left output 305. Energization of the relay coil 332 opens the relay contact 333.

The right control circuitry 340 comprises diodes 341 and 346 and a relay having a relay coil 342, normally-open relay contacts 343 and 345, and a normally-closed relay contact 344. The diodes 341 and 346 may be any suitable diodes, such as Part No. 1N4148 available from Motorola for example. The relay for the right control circuitry 340 may be any suitable relay, such as a double-pull, double-throw relay having Part No. AJW721138 available from Aromat for example.

The anode of the diode 341 is coupled to the right input 303, and the cathode of the diode 341 is coupled to a first end of the relay coil 342. The other end of the relay coil 342 is coupled to the ground terminal 311. The cathode of the diode 346 is coupled to the first end of the relay coil 342, and the anode of the diode 346 is coupled to the other end of the relay coil 342. The diodes 341 and 346 help to isolate the towing vehicle 110 from any electrical surges or noise by the circuitry 300.

The normally-open relay contact 343 selectively couples the right input 303 to a node 349. The node 349 corresponds to the right energization output 249 of FIG. 2. The normally-closed relay contact 344 selectively couples the brake input 302 to the node 349. The normally-open relay contact 345 selectively couples the brake input 302 to a node 348. The node 348 corresponds to the right enable output 248 of FIG. 2. Energization of the relay coil 342 closes both of the relay contacts 343 and 345 and opens the relay contact 344.

The right output circuitry 350 comprises diodes 351 and 356 and a relay having a relay coil 352 and a normally-closed relay contact 353. The diodes 351 and 356 may be any suitable diodes, such as Part No. 1N4148 available from Motorola for example. The relay for the right output circuitry 350 may be any suitable relay, such as a single-pull, double-throw relay having Part No. AZ8-1CH-9DE available from Zettler for example.

The anode of the diode 351 is coupled to the node 348, and the cathode of the diode 351 is coupled to a first end of the relay coil 352. The other end of the relay coil 352 is coupled to the ground terminal 311. The cathode of the diode 356 is coupled to the first end of the relay coil 352, and the anode of the diode 356 is coupled to the other end of the relay coil 352. The diodes 351 and 356 help to isolate the towing vehicle 110 from any electrical surges or noise by the circuitry 300.

The normally-closed relay contact 353 selectively couples the node 349 to the right output 306. Energization of the relay coil 352 opens the relay contact 353.

OPERATION OF TOW ADAPTER CIRCUITRY

The circuitry 300 initially couples the brake input 302 to both the left and right outputs 305–306 in a default position. The left control circuitry 320 couples the brake input 302 to the node 329 through the normally-closed relay contact 324, and the left output circuitry 330 couples the node 329 to the left output 305 through the normally-closed relay contact 333. The right control circuitry 340 couples the brake input 302 to the node 349 through the normally-closed relay contact 344, and the right output circuitry 350 couples the node 349 to the right output 306 through the normally-closed relay contact 353. When the towing vehicle 110 generates the brake signal at the brake input 302 in the absence of the left and right signals, the circuitry 300 couples the brake signal to both the left and right outputs 305–306 to energize the left and right tow lamps 121–122 for the duration of the brake signal.

When the towing vehicle 110 generates the left signal at the left input 301, the left control circuitry 320 couples the left input 301 and therefore the left signal to the node 329 as the left signal energizes the relay coil 322 to open the relay contact 324 and close the relay contact 323. The left control circuitry 320 also couples the brake input 302 to the node 328 as the energized relay coil 322 closes the relay contact 325.

In the absence of the brake signal, the left output circuitry 330 couples the left signal at the node 329 to the left output 305 through the normally-closed relay contact 333 to energize the left tow lamp 121. When the towing vehicle 110 pulsates the left signal then, the left control circuitry 320 generates a pulsating signal at the node 329 as the pulsating left signal periodically energizes the relay coil 322. The left output circuitry 330 then couples the pulsating signal at the node 329 to the left output 305 through the normally-closed relay contact 333 to flash the left tow lamp 121.

When the towing vehicle 110 generates the brake signal simultaneously with the left signal, the left control circuitry 320 couples the brake input 302 and therefore the brake signal to the node 328 as the left signal energizes the relay coil 322 to close the relay contact 325. The left output circuitry 330 isolates the left output 305 from the node 329 to deenergize the left tow lamp 121 as the brake signal at the node 328 energizes the relay coil 332 to open the relay contact 333.

When the towing vehicle 110 pulsates the left signal then, the left control circuitry 320 generates a pulsating signal at the node 328 by coupling the brake input 302 and therefore the brake signal to the node 328 each time the pulsating left signal energizes the relay coil 322. The left control circuitry 320 also generates a signal at the node 329 by coupling the left input 301 and therefore the left signal to the node 329 each time the pulsating left signal energizes the relay coil 322 and by coupling the brake input 302 and therefore the brake signal to the node 329 each time the pulsating left signal deenergizes the relay coil 322. The left output circuitry 330 generates a pulsating signal at the left output 305 to flash the left tow lamp 121 as the pulsating signal at the node 328 periodically energizes the relay coil 332 and therefore periodically couples the signal at the node 329 to the left output 305.

When the towing vehicle 110 generates the right signal at the right input 303, the right control circuitry 340 couples the right input 303 and therefore the right signal to the node 349 as the right signal energizes the relay coil 342 to open the relay contact 344 and close the relay contact 343. The right control circuitry 340 also couples the brake input 302 to the node 348 as the energized relay coil 342 closes the relay contact 345.

In the absence of the brake signal, the right output circuitry 350 couples the right signal at the node 349 to the right output 306 through the normally-closed relay contact 353 to energize the right tow lamp 122. When the towing vehicle 110 pulsates the right signal then, the right control circuitry 340 generates a pulsating signal at the node 349 as the pulsating right signal periodically energizes the relay coil 342. The right output circuitry 350 then couples the pulsating signal at the node 349 to the right output 306 through the normally-closed relay contact 353 to flash the right tow lamp 122.

When the towing vehicle 110 generates the brake signal simultaneously with the right signal, the right control circuitry 340 couples the brake input 302 and therefore the brake signal to the node 348 as the right signal energizes the relay coil 342 to close the relay contact 345. The right output circuitry 350 isolates the right output 306 from the node 349 to deenergize the right tow lamp 122 as the brake signal at the node 348 energizes the relay coil 352 to open the relay contact 353.

When the towing vehicle 110 pulsates the right signal then, the right control circuitry 340 generates a pulsating signal at the node 348 by coupling the brake input 302 and therefore the brake signal to the node 348 each time the pulsating right signal energizes the relay coil 342. The right control circuitry 340 also generates a signal at the node 349 by coupling the right input 301 and therefore the right signal to the node 349 each time the pulsating right signal energizes the relay coil 342 and by coupling the brake input 302 and therefore the brake signal to the node 349 each time the pulsating right signal deenergizes the relay coil 342. The right output circuitry 350 generates a pulsating signal at the right output 306 to flash the right tow lamp 122 as the pulsating signal at the node 348 periodically energizes the relay coil 352 and therefore periodically couples the signal at the node 349 to the right output 306.

Because the circuitry 300 couples the left signal, the brake signal, and the right signal directly to the left and right outputs 305–306 by the relay contacts 323–324, 333, 343–344, and 353, the circuitry 300 minimizes any voltage loss in generating the left and right signals for the towed vehicle 120. The circuitry 300 therefore minimizes any reduction in brightness with which the left and right tow lamps 121–122 are energized by the circuitry 300.

The circuitry 300 also provides suitable circuit paths to ground for both the tow adapter 100 and for the towing vehicle 110. As the circuitry 300 comprises the ground terminal 311, the circuitry 300 provides suitable circuit paths to ground independent of whether one or more tail light lamps 111–113 of the towing vehicle 110 are burned-out or removed. The circuitry 300 provides circuit paths to ground for the towing vehicle 110 through the left and right tow lamps 121–122. When any of the tail light lamps 111–113 of the towing vehicle 110 is burned-out or removed, then, the flasher unit of the towing vehicle 110 remains enabled to provide suitable pulsating signals as if the tail light lamps 111–113 were functioning properly.

Furthermore, the circuitry 300 couples the brake input 302 to both the left and right outputs 305–306 by the normally-closed relay contacts 324, 333, 344, and 353 for a default, fail-safe position. In this manner, the circuitry 300 adapts the brake signal from the towing vehicle 110 to energize the left and right tow lamps 121–122 regardless of whether the tow adapter 100 is functioning properly. In the event one or more relay coils 322, 332, 342, and 352 malfunctions, for example, the circuitry 300 nevertheless adapts the brake signal to energize the left and right tow lamps 121–122.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. In a tow adapter for adapting a first input signal and a second input signal from a towing vehicle for a towed vehicle, a method comprising the steps of:

a) receiving from the towing vehicle the first input signal at a first input of the tow adapter and the second input signal at a second input of the tow adapter;

b) selectively generating an enable signal and an energization signal based on the first input signal and the second input signal, wherein the selectively generating step (b) comprises the step of generating the energization signal by selectively coupling the first input and the second input to a node with a relay controlled by the first input signal such that only one of the first input and the second input is coupled to the node at a time; and c) selectively outputting the energization signal to the towed vehicle based on the enable signal, wherein the selectively outputting step (c) comprises the step of selectively coupling the node to an output of the tow adapter based on the enable signal.

2. The method of claim 1, wherein the first input signal is a turn signal and wherein the second input signal is a brake signal.

3. The method of claim 1, wherein the selectively outputting step (c) comprises the step of energizing another relay based on the enable signal to isolate the output of the tow adapter from the towed vehicle.

4. The method of claim 1, wherein the selectively generating step (b) comprises the step of selectively coupling the second input to another node based on the first input signal to generate the enable signal.

5. The method of claim 4, wherein the selectively generating step (b) comprises the step of selectively coupling the second input to the other node with the relay based on the first input signal.

6. In a tow adapter for adapting a turn signal and a brake signal from a towing vehicle for a towed vehicle, a method comprising the steps of:

a) receiving from the towing vehicle the turn signal at a turn input of the tow adapter and the brake signal at a brake input of the tow adapter;

b) selectively coupling the turn input or the brake input to a first node based on the turn signal to generate an energization signal;

c) selectively coupling the brake input to a second node based on the turn signal to generate an enable signal; and d) selectively coupling the first node to an output of the tow adapter based on the enable signal to output the energization signal to the towed vehicle.

7. The method of claim 6, wherein the selectively coupling step (b) comprises the step of energizing a relay based on the turn signal to couple the turn input to the first node; and wherein the selectively coupling step (c) comprises the step of energizing the relay based on the turn signal to couple the brake input to the second node.

8. The method of claim 6, comprising the step of coupling the brake input to the output of the tow adapter in a default position.

9. The method of claim 6, comprising the step of providing a ground terminal for the tow adapter.

10. An apparatus for adapting a first input signal and a second input signal from a towing vehicle for a towed vehicle, the apparatus comprising:
   a) control circuitry having a first input for receiving the first input signal from the towing vehicle and having a second input for receiving the second input signal from the towing vehicle, the control circuitry for selectively generating an enable signal and an energization signal based on the first input signal and the second input signal, the control circuitry comprising a relay coupled to receive the first input signal for selectively coupling the first input and the second input to a node based on the first input signal to generate the energization signal, wherein only one of the first input and the second input is coupled to the node at a time; and
   b) output circuitry coupled to the control circuitry for receiving the energization signal and the enable signal, the output circuitry for selectively outputting the energization signal to the towed vehicle based on the enable signal by selectively coupling the node to an output of the tow adapter based on the enable signal.

11. The apparatus of claim 10, wherein the first input signal is a turn signal and wherein the second input signal is a brake signal.

12. The apparatus of claim 10, wherein the output circuitry comprises another relay coupled to receive the enable signal for isolating the output of the tow adapter from the towed vehicle based on the enable signal.

13. The apparatus of claim 10, wherein the control circuitry selectively couples the second input to another node based on the first input signal to generate the enable signal.

14. The apparatus of claim 13, wherein the relay selectively couples the second input to the other node based on the first input signal.

15. An apparatus for adapting a turn signal and a brake signal from a towing vehicle for a towed vehicle, the apparatus comprising:
   a) control circuitry having a turn input for receiving the turn signal from the towing vehicle and having a brake input for receiving the brake signal from the towing vehicle,
   the control circuitry for selectively coupling the turn input or the brake input to a first node based on the turn signal to generate an energization signal,
   the control circuitry for selectively coupling the brake input to a second node based on the turn signal to generate an enable signal; and
   b) output circuitry coupled to the first node for receiving the energization signal and to the second node for receiving the enable signal, the output circuitry for selectively coupling the first node to an output based on the enable signal to output the energization signal to the towed vehicle.

16. The apparatus of claim 15, wherein the control circuitry comprises a relay coupled to receive the turn signal for coupling the turn input to the first node and the brake input to the second node based on the turn signal.

17. The apparatus of claim 15, wherein the control circuitry and the output circuitry couple the brake input to the output in a default position.

18. The apparatus of claim 15, wherein the apparatus comprises a ground terminal for the control circuitry and the output circuitry.

19. An apparatus for adapting a left turn signal, a right turn signal, and a brake signal from a towing vehicle for a towed vehicle, the apparatus comprising:
   a) left control circuitry having a left turn input for receiving the left turn signal from the towing vehicle and having a brake input for receiving the brake signal from the towing vehicle,
   the left control circuitry for selectively coupling the left turn input or the brake input to a first node based on the left turn signal to generate a left energization signal,
   the left control circuitry for selectively coupling the brake input to a second node based on the left turn signal to generate a left enable signal;
   b) left output circuitry coupled to the first node for receiving the left energization signal and to the second node for receiving the left enable signal, the left output circuitry for selectively coupling the first node to a left output based on the left enable signal to output the left energization signal to the towed vehicle;
   c) right control circuitry having a right turn input for receiving the right turn signal from the towing vehicle and having a brake input for receiving the brake signal from the towing vehicle,
   the right control circuitry for selectively coupling the right turn input or the brake input to a third node based on the right turn signal to generate a right energization signal,
   the right control circuitry for selectively coupling the brake input to a fourth node based on the right turn signal to generate a right enable signal; and
   d) right output circuitry coupled to the third node for receiving the right energization signal and to the fourth node for receiving the right enable signal, the right output circuitry for selectively coupling the third node to a right output based on the right enable signal to output the right energization signal to the towed vehicle.

20. The apparatus of claim 19, wherein the left control circuitry comprises a first relay coupled to receive the left turn signal, the first relay for coupling the left turn input to the first node and the brake input to the second node based on the left turn signal; and
   wherein the right control circuitry comprises a second relay coupled to receive the right turn signal, the second relay for coupling the right turn input to the third node and the brake input to the fourth node based on the right turn signal.

21. The apparatus of claim 19, wherein the left control circuitry and the left output circuitry couple the brake input to the left output in a default position; and
   wherein the right control circuitry and the right output circuitry couple the brake input to the right output in a default position.

22. A tow adapter for adapting a turn signal and a brake signal from a towing vehicle for a towed vehicle, the apparatus comprising:
   a) control circuitry having a turn input for receiving the turn signal from the towing vehicle and having a brake input for receiving the brake signal from the towing vehicle, the control circuitry comprising:
      i) a first relay coil coupled to the turn input for receiving the turn signal,
      ii) a first relay contact coupled to the turn input and to a first node for selectively coupling the turn input to the first node to generate an energization signal when the first relay coil is energized by the turn signal.

iii) a second relay contact coupled to the brake input and to the first node for selectively coupling the brake input to the first node to generate the energization signal when the first relay coil is deenergized by the turn signal, and iv) a third relay contact coupled to the brake input and to a second node for selectively coupling the brake input to the second node to generate an enable signal when the first relay coil is energized by the turn signal; and b) output circuitry coupled to the first node and to the second node, the output circuitry comprising:

i) a second relay coil coupled to the second node for receiving the enable signal, and ii) a fourth relay contact coupled to the first node and to an output for selectively coupling the first node to the output to output the energization signal to the towed vehicle when the second relay coil is deenergized by the enable signal.

23. The tow adapter of claim 22, comprising a ground terminal coupled to the first relay coil and to the second relay coil.

24. The tow adapter of claim 22, comprising a first diode coupled between the turn input and the first relay coil, a second diode coupled across the first relay coil, a third diode coupled between the second node and the second relay coil, and a fourth diode coupled across the second relay coil.

* * * * *